2,834,773
STABILIZATION OF COPPERIZED AZO DYESTUFFS

Mario Scalera, Somerville, Frederick Brody, Plainfield, and Frank Fazio, Bound Brook, N. J., assignors to American Cyanamid Company, New York, N. Y., a corporation of Maine No Drawing. Application September 23, 1952
Serial No. 311,152

16 Claims. (Cl. 260—148)

This invention relates to stabilized compositions containing a copperized dye derived from dianisidine and 1-amino-8-naphthol-2,4-disulfonic acid.

This dyestuff, prepared from coupling dianisidine with 1-amino-8-hydroxy-naphthalene - 2,4 - disulfonic acid and metallizing with copper, was originally described in U. S. Patent 2,036,159. It has the probable composition in its free acid form:

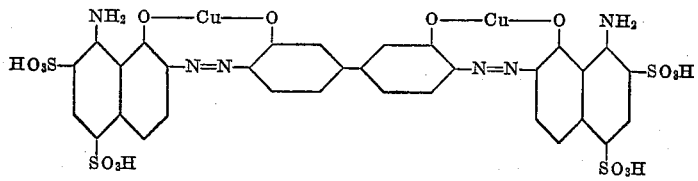

It may also be isolated as its ammonium or alkali metal salts which can be used equivalently for dyeing. It has been found that this dyestuff on storing loses its color strength over a period of time. In addition, the shade is found to change markedly, shifting to a redder and duller shade of blue. Such a property is a great handicap in the commercial use, for a manufacturer can never be sure how soon after its preparation the dyer is going to use its products. Any dyestuff which deteriorates on storing would soon become useless to the buyer. Up to now, there is nothing in the prior art which teaches how this dyestuff may be stabilized.

It has been found that this deterioration can be greatly delayed, or even entirely prevented, by treatment of the dyestuff with a water-soluble organic sequestering agent. An organic sequestering agent may be defined as an organic substance having at least one anionic group capable of forming a salt with a heavy metal ion, and at least one group containing a non-metallic atom of groups 5 and 6 of the periodic table capable of forming a coordinate bond to the metal ion to produce complexes with such heavy metal ions which are water-soluble. The most important groups of organic sequestering agents are hydroxy and amino polycarboxylic acids, in which the hydroxy group containing the oxygen atom, or the amino group, in the case of the amino polycarboxylic acids, participates in chelate formation together with the carboxyl group and the metal ion. The most commonly used organic sequestering agent is ethylenediamine N,N,N',N'-tetraacetic acid, ethylenediamine N-hydroxyethyl N,N',N'-triacetic acid and ethylenediamine N,N'-di(hydroxyethyl)N,N'-diacetic acid. Other organic sequestering agents are nitrilotriacetic acid, C-alkyl and C-aryl nitrilotriacetic acids, imino-bis-succinic acid, pentacarboxymethyl diethylenetriamine, hexacarboxymethyltriethylenetetramine, and similar compounds.

It is not known with certainty just how the stabilization of the present invention is effected and it is, therefore, not intended to limit the invention to any theory of action. The amount of sequestering agent to be used is not critical, but for reasons of economy large excesses should be avoided. The lower limit on sequestering agent is about 1% of the weight of the dyestuff; improved stabilization results as the amount is increased up to about 10% at which point the result is close to optimum. The lower limit on the sequestering agent is very materially less than the amount which would theoretically be required to react with all of the copper in the dye. Rather surprisingly the sequestering agent does not react with the copper in the actual dye complex as it does not change the shade of the color. It is not known just why the stabilizing action takes place with the small amount of sequestering agent used and it is not desired to limit the invention to any particular theory.

It is an advantage of the present invention that this stabilizing agent can be added at various stages of the production of the dyestuff. Thus, for example, it can be added in the metallization reaction mixture immediately after metallization has been completed and before the product has been isolated. Another good way is to add the sequestering agent in the form of a water solution during the isolation, which results in washing the filter cake of the dyestuff with a solution of the stabilizing agent. It is also possible to isolate the filter cake of the dyestuff and then reslurry it in a water solution of the stabilizing agent and again isolate by filtering. Dry blending or wet blending may also be used. Thus, the dry stabilizing agent may be mixed with the wet presscake or with a dry powder. Any of these various treatments will result in a stable dyestuff which can be kept for long periods of time without substantial loss of color value or change in shade.

The dyestuff is shown in the formula above as a free sulfonic acid. Its alkali salts may also be isolated and stabilized in the same manner and are equivalent in every respect.

Our invention can be illustrated by the following examples, in which the parts are by weight unless otherwise specified.

Example 1

A dyestuff was prepared from 600 parts of dianisidine by tetrazotizing and coupling with two mols of 1-amino-8-naphthol-2,4-disulfonic acid, followed by copperizing. The wet cake of metallized dye, after filtration, was reslurried into 35,000 parts by volume of water. To this slurry was added 1250 parts by volume of a 34% solution of the sodium salt of N,N,N',N'-ethylenediamine tetraacetic acid. The slurry was stirred until stabilization was complete and the dyestuff was then isolated by salting out and filtering. The product was then tested for stability by an accelerated aging test in which a paste of the product was sealed in a tube under oxygen and heated for ten days at 80° C.

The stabilized dyestuff as described above showed strengths of at least 95% after the accelerated aging test, whereas the same dyestuff unstabilized showed only 61% strength. On storing for six months, the stabilized product showed little loss in strength or change in shade, while the untreated dyestuff lost 30% of its color value and became redder and duller.

Example 2

The procedure of Example 1 was followed, but an equivalent amount of the trisodium salt of nitrilotriacetic acid was used in place of the sodium salt of the ethylenediamine tetraacetic acid. The results obtained were substantially the same, the product showing the same excellent stability.

Example 3

Metallized dye from 320 parts of dianisidine was filtered in the usual manner to recover a presscake which was washed with brine and then with a 17% solution of the tetrasodium salt of ethylenediamine tetraacetic acid, the solution containing 5% of sodium chloride. The product obtained showed no loss of strength after the accelerated aging test described in Example 1; in fact, on measurement, the strength actually was 103%. There was no substantial change in shade, whereas untreated material lost heavily in strength, as described in Example 1, and changed shade. The same effect is obtained with a trisodium salt of nitrilotriacetic acid.

Example 4

The dyestuff from 600 parts of dianisidine was filtered and the wet cake blended with 1000 parts by volume of a 34% solution of the tetrasodium salt of ethylenediamine tetraacetic acid. The wet cake was dried in an oven at 60–70° C. and when tested on the accelerated aging test of Example 1 showed a strength of 97% with no change in shade.

Example 5

300 parts of the dry dyestuff of Example 1 was blended with 70 parts by volume of a 34% solution of the tetrasodium salt of ethylenediamine tetraacetic acid. The product was subjected to the accelerated aging test and showed no loss in strength.

Instead of using a solution of the stabilizing agent, an equivalent quantity of the dry powder tetrasodium salt of ethylenediamine tetraacetic acid is blended directly with the dried dyestuff and gave similar protection against deterioration on storage.

Example 6

The dyestuff prepared by the procedure of Example 1 from 600 parts of dianisidine was treated immediately after metallization with 10,000 parts by volume of a 34% solution of the tetrasodium salt of ethylenediamine tetraacetic acid. The mixture was stirred until stabilization was complete, the product salted out and filtered. Several samples of the product, when subjected to the accelerating aging test described in Example 1 showed strengths of 95–99%.

Example 7

The procedure of Example 1 was repeated using in place of the ethylenediamine tetraacetic acid an equivalent amount of the sodium salt of ethylenediamine N-hydroxyethyl N,N',N'-triacetic acid. The results obtained on accelerated aging were substantially the same as in Example 1, excellent stability resulting.

Example 8

The procedure of Example 1 was followed replacing the salt of ethylenediamine tetraacetic acid with an equivalent amount of ethylenediamine N,N'-di(hydroxyethyl)N,N'-diacetic acid. The same effective stabilization was obtained.

We claim:

1. A storage-stable composition comprising the dyestuff obtained by coupling tetrazotized dianisidine with 1-amino-8-naphthol-2,4-disulfonic acid and copperizing, and a water-soluble aliphatic aminopolycarboxylic acid sequestering agent in an amount of at least 1% and not exceeding about 10% of the weight of the dyestuff.

2. A composition according to claim 1 in which the sequestering agent is a soluble salt of ethylenediamine N,N,N',N'-tetraacetic acid.

3. A composition according to claim 1 in which the sequestering agent is a water-soluble salt of nitrilotriacetic acid.

4. A composition according to claim 1 in which the dyestuff is in the form of a wet cake.

5. A composition according to claim 4 in which the sequestering agent is a souble salt of ethylenediamine N,N,N',N'-tetraacetic acid.

6. A composition according to claim 1 in which both the sequestering agent and the dyestuff are dry powders and the mixture is a dry blend.

7. A composition according to claim 6 in which the sequestering agent is a soluble salt of ethylenediamine N,N,N',N'-tetraacetic acid.

8. A composition according to claim 1 in which the sequestering agent is a water-soluble salt of ethylenediamine N-hydroxyethyl N,N',N'-triacetic acid.

9. A composition according to claim 1 in which the sequestering agent is a water-soluble salt of ethylenediamine N,N'-di(hydroxyethyl)N,N'-diacetic acid.

10. A process of stabilizing the dyestuff prepared by the coupling of tetrazotized dianisidine with 1-amino-8-naphthol-2,4-disulfonic acid and copperizing, which comprises treating said dyestuff with a water-soluble aliphatic aminopolycarboxylic acid sequestering agent in an amount of at least 1% and not more than about 10% of the weight of the dyestuff.

11. A process according to claim 10 in which the sequestering agent is a water-soluble salt of ethylenediamine N,N,N',N'-tetraacetic acid.

12. A process according to claim 10 in which the sequestering agent is a water-soluble salt of nitrioltriacetic acid.

13. A process according to claim 10 in which a solution of the sequestering agent in water is added to the reaction mixture after carrying out metallization and before isolation of the dyestuff.

14. A process according to claim 10 in which the dyestuff is isolated as a wet presscake and is washed with the solution of a sequestering agent in water.

15. A process according to claim 10 in which a wet cake of the dyestuff is blended with a sequestering agent and the mixture is dried.

16. A process according to claim 10 in which a presscake of the dyestuff is reslurried in a solution of the sequestering agent in water.

References Cited in the file of this patent

UNITED STATES PATENTS

| | | |
|---|---|---|
| 2,036,159 | Mendoza | Mar. 31, 1936 |
| 2,168,181 | Ulrich et al. | Aug. 1, 1939 |
| 2,308,021 | Munz | Jan. 12, 1943 |
| 2,361,301 | Libby et al. | Oct. 24, 1944 |

OTHER REFERENCES

Zussman: "Sequestering Agents . . . ." American Dyestuff Reporter, June 27, 1949, pages 500–504.